United States Patent [19]
Glorioso et al.

[11] Patent Number: 5,723,506
[45] Date of Patent: Mar. 3, 1998

[54] EXTRUDED POLYMER FOAM WITH FILLER PARTICLES AND METHOD

[75] Inventors: Sammie J. Glorioso, Ridgeland, Miss.; James H. Burgess, Greenville, S.C.

[73] Assignee: Apache Products Company, Anderson, S.C.

[21] Appl. No.: 740,779

[22] Filed: Nov. 1, 1996

Related U.S. Application Data

[63] Continuation-in-part of Ser. No. 369,400, Jan. 6, 1995, which is a continuation-in-part of Ser. No. 144,621, Nov. 1, 1993, Pat. No. 5,424,014, which is a continuation of Ser. No. 946,738, Sep. 18, 1992, abandoned.

[51] Int. Cl.$^6$ .......................... B29C 44/20; B29C 44/50
[52] U.S. Cl. .................. 521/79; 264/45.3; 264/45.9; 264/51; 264/53; 521/155; 521/917
[58] Field of Search .................. 521/79, 155, 917; 264/45.3, 45.9, 51, 53

[56] References Cited

U.S. PATENT DOCUMENTS

| | | | |
|---|---|---|---|
| 3,466,705 | 9/1969 | Richie | 18/14 |
| 3,625,872 | 12/1971 | Ashida | 260/2.5 AK |
| 3,892,686 | 7/1975 | Woo | 260/2.5 A |
| 3,933,701 | 1/1976 | Puig et al. | 260/2.5 AT |
| 4,046,849 | 9/1977 | Lever et al. | 264/174 |
| 4,094,829 | 6/1978 | Shearing | 260/2.5 AK |
| 4,097,400 | 6/1978 | Wortmann et al. | 252/182 |
| 4,129,693 | 12/1978 | Cenker et al. | 521/106 |
| 4,153,764 | 5/1979 | Blount | 521/155 |
| 4,165,411 | 8/1979 | Marans et al. | 521/107 |
| 4,284,826 | 8/1981 | Aclony | 568/614 |
| 4,292,214 | 9/1981 | Blount | 260/9 |
| 4,307,203 | 12/1981 | Blount | 521/136 |
| 4,341,876 | 7/1982 | Kreuer et al. | 521/170 |
| 4,349,494 | 9/1982 | Fulmer | 264/45.3 |
| 4,377,646 | 3/1983 | Blount | 521/154 |
| 4,395,214 | 7/1983 | Phipps et al. | 425/214 |
| 4,451,583 | 5/1984 | Chesler | 521/49.5 |
| 4,504,603 | 3/1985 | Hicks | 521/85 |
| 4,506,040 | 3/1985 | Raes et al. | 521/137 |
| 4,551,483 | 11/1985 | Hicks | 521/103 |
| 4,569,952 | 2/1986 | Radovich et al. | 521/167 |
| 4,597,927 | 7/1986 | Zeitler et al. | 264/85 |
| 4,607,061 | 8/1986 | Schmidt | 521/122 |
| 4,614,754 | 9/1986 | Christman | 521/167 |
| 4,664,563 | 5/1987 | Christman | 405/288 |
| 4,724,250 | 2/1988 | Schubert et al. | 524/707 |
| 4,780,484 | 10/1988 | Schubert et al. | 521/106 |
| 4,792,576 | 12/1988 | Nodelman | 521/174 |
| 4,795,763 | 1/1989 | Gluck et al. | 521/99 |
| 4,871,477 | 10/1989 | Dimanshteyn | 252/609 |
| 4,948,859 | 8/1990 | Echols et al. | 528/28 |
| 4,960,803 | 10/1990 | Muhl et al. | 521/106 |
| 5,057,545 | 10/1991 | Muhl et al. | 521/103 |
| 5,094,318 | 3/1992 | Maeda et al. | 181/290 |
| 5,137,930 | 8/1992 | Soukup | 521/99 |
| 5,149,722 | 9/1992 | Soukup | 521/99 |
| 5,397,807 | 3/1995 | Hitchcock et al. | 521/99 |
| 5,424,014 | 6/1995 | Glorioso et al. | 264/45.3 |
| 5,461,098 | 10/1995 | Hitchcock et al. | 521/99 |
| 5,508,315 | 4/1996 | Mushovic | 521/99 |

*Primary Examiner*—Morton Foelak
*Attorney, Agent, or Firm*—Volpe and Koenig, P.C.

[57] ABSTRACT

A thermosetting foam, preferably polyisocyanurate or polyurethane foam, is prepared in an extruder which permits the incorporation of high levels of filler particles. The method includes introducing polyol, isocyanate and filler particles to an extruder screw for mixing. In conjunction with extruding, a catalyst is added. The catalyst may be added either in a last extruder barrel or with the extruder head. Foam with filler particle content in excess of 12% made be readily made. Filler particles, such as aluminum trihydrate, perlite, carbon black, diatomaceous earth, polyiso powders, ammonium phosphate, fly ash, barium sulfate, calcium silicate, and calcium carbonate, may be used. The process described is preferably used for making foam boards or bunstock.

18 Claims, 5 Drawing Sheets

EXTRUDED POLYMER FOAM WITH FILLER PARTICLES AND METHOD

This application is a continuation-in-part of application Ser. No. 08/369,400, filed on Jan. 6, 1995, which is a continuation-in-part of U.S. application Ser. No. 08/144,621, filed Nov. 1, 1993, which issued as U.S. Pat. No. 5,424,014 on Jun. 13, 1995, which is a file wrapper continuation of Ser. No. 07/946,738, filed Sep. 18, 1992, now abandoned.

BACKGROUND OF THE INVENTION

1. Field Of The Invention

The invention relates to foamed polymer material, methods for producing polymer foams, and, particularly, to a method for extruding polymer foam material, such as polyisocyanurate and polyurethane foams, using a screw-type extruder. The extruded polymer foams contain substantial amounts of filler particles.

2. Description of the Prior Art

Polymer foams, such as polyisocyanurate and polyurethane foams, have not previously been able to be produced using an extruder. The foaming material "firms" in the extruder and blocks the equipment. Additionally, use of filler materials has been limited using conventional methods to produce foam sheets.

U.S. Pat. No. 3,466,705, (Richie) describes an apparatus for extruding foamable thermoplastic material, such as polystyrene, preferably in tubular form. Richie discloses that the apparatus can be used for thermosetting materials, such as polyurethanes, but that steam or hot water would have a damaging effect and therefore are not used. A foam-augmenting gas such as Freon is used as the foaming agent. Richie uses an expansion space of transverse cross-sectional area which increases in size gradually in the direction of travel of the extruded product.

U.S. Pat. No. 5,149,722 (Soukup) and U.S. Pat. No. 4,795,763 (Gluck) describe the use of about 1–10% by weight of carbon black as a filler material. Gluck specifically recites the problem of cell rupture which can occur with the addition of too much filler materials. The Soukup and Gluck patents are incorporated herein by reference as if fully set forth.

SUMMARY OF THE INVENTION

Polymer foam board is disclosed which includes high levels of filler material, such as 15%–20% by weight filler particles, or higher. Polyisocyanurate or polyurethane foam is made using a screw-type extruder for mixing the components of the composition. Isocyanate and polyol are introduced into a screw of an extruder. Filler particles are also introduced in the extruder screw. The isocyanate, polyol, and filler particles are mixed together with a foaming agent and, optionally, a surfactant with the extruder to produce a high quality dispersion. The mixture is cooled via a cooling manifold of the screw extruder and the addition of the various components in the mixture. Cooling inhibits reaction of the mixed components within the screw.

Catalyst is added and mixed with the polyol/isocyanate/filler particle mixture in conjunction with extrusion proximate the extruder head, either in the last extruder barrel or the extruder head itself as a final mixing step. After the catalyst is introduced, the mixture immediately exits the extruder onto a conveyor so that the foaming and firming occurs outside of the extruder to avoid clogging. The mixture is foamed and firmed on the conveyor in a conventional manner and, preferably, formed into a continuous flat sheet which is thereafter cut to produce boards of standard sizes. Paper liners may be applied to both sides of the foam as it travels on the conveyor.

The filler particles included in the thermoset foams produced in accordance with the invention maintain the mechanical or insulative characteristics of the resultant extruded foam as compared to the properties of the extruded foam without filler particles. However, with some fillers improved characteristics result. For example, carbon black can improve the insulation properties of the foam as set forth in the Soukup and Gluck patents, supra. Ammonium phosphate can improve flame-retardant properties. Overall, the addition of filler particles makes the resultant foam more economical to produce and the process enables the use of more filler materials in the production of suitable foam board insulation.

Different filler particles can be used in the same foam. For example, carbon black and another type filler particle, which is less expensive, can be used to gain the insulative effect of the carbon black while increasing costs savings. Aluminum trihydrate, perlite, ammonium phosphate and calcium carbonate are preferred filler materials, used either as the sole filler material or with carbon black. Other filler materials include carbon black, fly ash, diatomaceous earth, polyiso powder, barium sulfate, melamine and calcium silicate. The filler particles added to the polyol/isocyanate mixture in the extruder reduce the cost of the resultant extruded thermoset foam, since the filler particles are lower in cost than polyol and/or polyisocyanate.

Ammonium phosphate is also useful as a filler particle. This includes ammonium phosphate and ammonium polyphosphate compounds, including ammonium phosphate, primary ammonium phosphate, secondary ammonium phosphate and other like phosphate compounds. Monobasic ammonium phosphate has been found especially useful as a filler particle.

The filler particles and/or dispersant and/or foaming agent and/or surfactant may be mixed with the isocyanate or with the polyol before introduction thereof to the extruder screw. If multiple fillers are used, they can be mixed prior to entering the extruder screw or can be introduced, simultaneously or separately, into the extruder screw and mixed therein. Entry of the filler particles, or a filler particle mixture can occur simultaneously or separately from entry of dispersing agent and/or surfactant and/or the polyol and/or the isocyanate. Preferably, the filler particles have a Tyler Mesh size of 20 or smaller where only about 4% of the filler is 20 mesh. More preferably, the size of the filler particles are between 50–300 mesh, and most preferably 80–300 mesh.

The foaming agent, which is preferably a hydrochlorofluorocarbon (HCFC) or water, is preferably introduced directly into the extruder or may be mixed with one of the components, preferably the polyol, before introduction thereof to the extruder screw. If water is the foaming agent, the water reacts with the isocyanate to form carbon dioxide, which further foams the mixture. Other foaming agents may alternatively be used.

Foam cell size is generally decreased when extruder speed is increased.

A filler particle dispersion may be made in the extruder using filler particles, dispersant, optional surfactant, and isocyanate or polyol. Preferably, a catalyst is added to this dispersion for immediate extrusion and foaming. Alternatively the dispersion can be stored for future use. An extruder provides better quality dispersion, measuring 7 or more on the Hegman scale, than a dispersion made in a Kady (kinetic dispersion) mill.

It is an object of the invention to provide an improved method for making polymer foams containing filler particles.

It is another object of the invention to provide a method for extruding filler particle-containing thermosetting foams, such as polyisocyanurate and polyurethane foams, using a screw-type extruder, such as a single-screw or twin-screw extruder.

It is yet another object of the invention to provide a method for making a filler particle dispersion in an extruder.

It is a further object of the invention to combine preparation of a filler particle dispersion and production of a foam using the filler particle dispersion, in a single operation.

DESCRIPTION OF THE PREFERRED EMBODIMENTS

Figure 1:
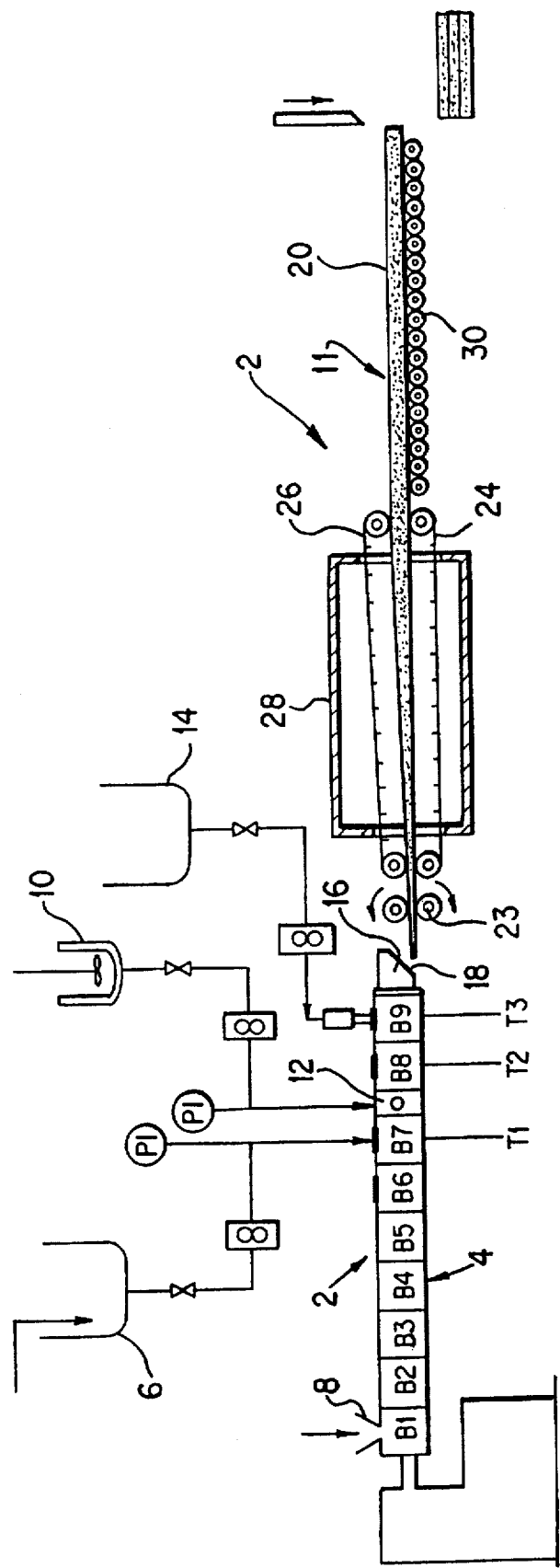
FIG. 1 is a schematic illustration of an apparatus for extruding polymer foam onto a conveyor.

Thermosetting foams, such as polyisocyanurate or polyurethane foams, are made using an extruder for mixing the foamable mixture before extruding onto a belt conveyor. Through such a continuous process, thermosetting foams are made much faster than previously possible without any decrease in quality. Additionally, the process enables the dispersion of filler particles with the polymer mixture to produce foams which include greater than 12% by weight of filler particles thereby reducing the production cost of the thermoset foams. Preferable range of filler particles is 12–50% by weight, more preferably 15–50% by weight.

The extruder enhances the dispersion of the polymer mixture. A twin-screw extruder is preferred. However, a single screw extruder with multiple mixing sections can also be used. The extruder can process materials for making a thermosetting polymer, such as an isocyanate polymer, in a controlled manner with independent catalyst addition and variable reactivity. High quality filler particle dispersions in isocyanate or polyol media are obtained. These dispersions exceed 7 on the Hegman scale. Moreover, higher levels of filler particles can be handled than on conventional foam mixing equipment.

The foams may be blown with blowing agents such as hydrochlorofluorocarbons (HCFC), CFC, HFC, HC, liquid $CO_2$ and/or water which produces $CO_2$. Typical examples of hydrochlorofluorocarbon blowing agents are HCFC 141b and HCFC 22 which can be advantageously combined in preferred proportions. High viscosity isocyanates and polymer premix, which cannot be processed using a conventional Kady mill and conventional foam mixing equipment, may be used in the process described.

The extruder is cooled downstream of the dispersion section of the extruder to prevent premature reaction of the foam ingredient The low torque requirements permits use of virtually any size extruder. Flocculation of filler particle/ polyol dispersions can be avoided by maintaining a high shear rate on the dispersion, through the foaming section, producing a foam with excellent filler particle dispersion.

In general, the quality of the dispersion increases with a decrease in filler particle size and with increased viscosity of the starting medium. Decreasing the particle size enables the use of higher loading of filler material without detriment to dispersion quality. Addition of the polyol or isocyanate in the dispersion section may be accomplished in several staged injections. This is preferred for keeping the viscosity and shear high enough to ensure a high quality dispersion.

The preferred dispersions were obtained when the charge of filler particles was added with the first injection of the dispersion medium to form a mixture. The final preferred filler percentage of 12% to 20% was then obtained by subsequent liquid injections in the dispersion section of the extruder. Maximum temperatures of about 50° C. in the dispersion section do not present an operational problem. The dispersion is actively cooled by cold water circulating in the barrel jackets and screws and passively cooled by injection of the remaining foam ingredients into the dispersion.

A preferred extruder screw speed to provide a good foam mix is about 300–900 rpm, with 600–800 rpm typical. Speeds may range to 1000 rpm or higher. For extended use at high speed, a special hardening treatment is advantageously used on the screw element in the dispersion section due to the abrasiveness of the filler particles. Throughput is a function of both screw speed and extruder size. A desired throughput for a 30–40 mm extruder is about 450–600 lb./hr.

One method of extruding polyisocyanurate foam includes adding a blend of isocyanate, and filler particles at a first position of the extruder, adding polyol blend to mix with the isocyanate blend at a second position of the extruder closer to the extrusion position than the first position, adding catalyst blend to the mixed polyol and isocyanate blend at a third position of the extruder proximate the extrusion position, and extruding the catalyzed mixture onto a belt conveyor for foaming.

With reference to FIG. 1, an extruder apparatus 2 suitable for practicing the invention is illustrated. The apparatus 2 includes an extruder 4 which has barrels, B1–B9. A single or twin screw extruder may be used. A twin screw extruder provides better mixing and is preferred. The barrels of the extruder are preferably separated by sheets of Graphoil paper, which aids in taking down the apparatus.

isocyanate solution is mixed and provided to reservoir 6 having a large capacity, preferably a 30 gallon capacity. A suspension of filler particles in the isocyanate may be fed to reservoir 6 or the filler particles can be fed into barrel B1 via a hopper 8. Solution from reservoir 6 is fed, in a non-limiting example, to barrel B7 of extruder 4. Polyol is mixed with water (foaming agent), for example in Lightening mixer 10, and fed to extruder 4 at location 12, between barrels B7 and B8. Alternatively, the isocyanate and the filler particles may be fed, for example, to hopper 8 feeding into barrel B1, and the isocyanate and/or filler particles mixed together in the extruder before the polyol is added.

The polyol and isocyanate containing filler particles and/ or carbon black are mixed in the extruder. Thereafter catalyst is fed from a reservoir 14 to barrel B9 and mixed therewith. The catalyzed mixture is fed through the discharge end of the extruder onto a belt conveyor. The discharge end 16 of the extruder 4 suitably has an inclined discharge piece 18 or a flat discharge piece (FIG. 4), for directing the foam downward onto a conveying/forming apparatus 11.

The temperature in the extruder is controlled by cooling the barrels and screws, as known in the art. Barrels B7 through B9 (at least) are cooled, generally by water cooling, to facilitate mixing the components of the reaction mixture without clogging the extruder.

The conveying/forming apparatus 11 includes a conveyor 20, onto which the foam is discharged from end 16 of extruder 4. The foam, passes between a pair of rolls 23 which rotate in opposite directions and then onto a slat conveyor 24, 26 through a heated area 28 in which the foam rises.

Optionally the foam is introduced between upper and lower paper liners. Appropriate location of the lining paper rolls (not shown) is apparent to one skilled in the art. The resultant product is a laminated insulation sheet.

Slat conveyors typically vary from 20–100 feet in length. The slat conveyor 24 is heated to about 150° F. This portion of the conveyor is substantially closed in by enclosure 28 to conserve heat. Doors (not shown) are placed about every 10 ft. along the enclosure to allow access to the equipment. The mixture foams and firms as it passes at about 30 to 250 ft./min. along the conveyor. The foam passes onto a roller conveyor 30 about 20 to 100 ft. in length, substantially at room temperature for curing before being cut into panels for use. A typical apparatus of this type is shown in Gluck, U.S. Pat. No. 4,795,763, discussed above.

Figure 2:
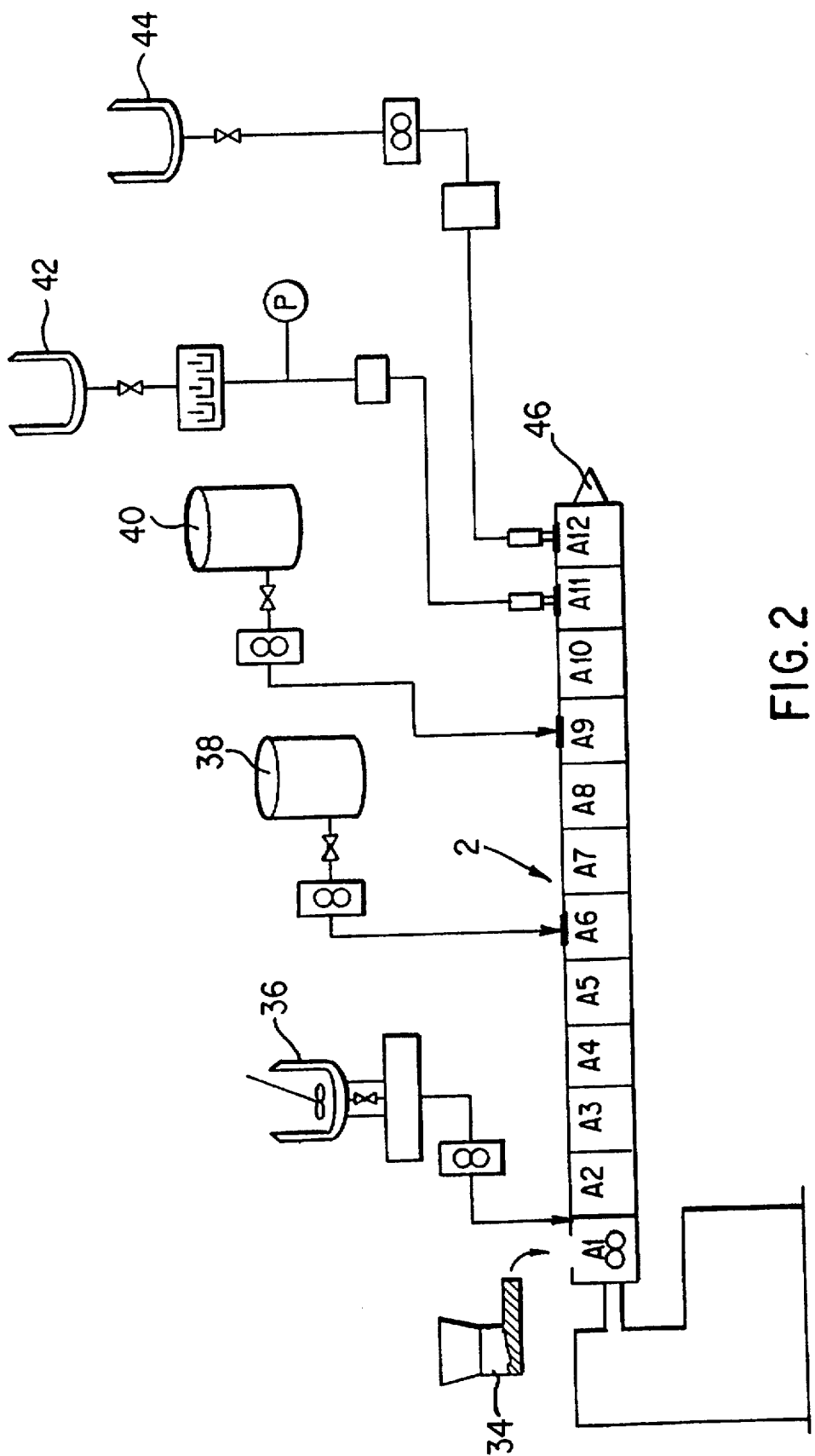
FIG. 2 is a schematic illustration of an extruder for an integrated process including preparation of a polymer premix before extruding the polymer mixture for foaming.

In another example, shown in FIG. 2, an extruder 32 having 12 barrels A1–A12 is used. Filler particles are fed to barrel A1 from hopper 34, a premix of polyol and surfactant is fed from mixer 36 between barrels A1 and A2 and mixed together with the filler particles in the extruder screw. The remainder of the polyol is added from a reservoir 38 to barrel A6 and mixed with the filler particle and optional carbon black and polyol premix. Isocyanate is fed from a reservoir 40 to barrel A9 and mixed with the ingredients already in the screw of the extruder. In this example, hydrochlorofluorocarbon blowing agent (HCFC-141b) is used, and is added from a reservoir 42 to barrel A11. Catalyst, such as potassium octoate, is added from a reservoir 44 to barrel A12 of the extruder, and mixed into the reaction mix immediately before extrusion. The mixture is extruded from extruder head 46 onto a conveying/forming apparatus, such as illustrated in FIG. 1.

Where more than one type of filler material is to be used, separate feed bins 48 for each type of material are provided. The amount of filler fed to the hopper 34 from each bin is controlled to provide a desired proportion. A preferred combination of filler materials is carbon black and aluminum trihydrate, relative proportions are dependent upon the R value and physical properties desired. For making dispersions without foaming, the fillers are added via hopper 34 and the isocyanate is added from mixer 36 and reservoir 38.

It is well known in the art of thermosetting foams that, in the process of making polyisocyanurate or polyurethane foams, when the mixture is prepared, there is an exothermic foaming reaction. The speed of this reaction is controllable according to the temperature at which the reaction takes place. The foaming action is described as having a "cream time", during which foaming is initiated and the material reaches a consistency of a soft creamy foam, and a "firm time" at which the foam sets up and hardens. In a typical non-limiting example, the cream time may be 7 to 12 seconds and the firm time may be 35 to 60 seconds. The properties of the product may be changed by adjusting the concentrations of the materials, temperatures of the barrels, etc.

In prior attempts to extrude thermosetting resins of this type, extrusion has not been successful because the reaction mechanism has not been controlled within the extruder and the mixture has creamed and/or foamed within the extruder and blocked the extruder, preventing extrusion.

Figure 4:
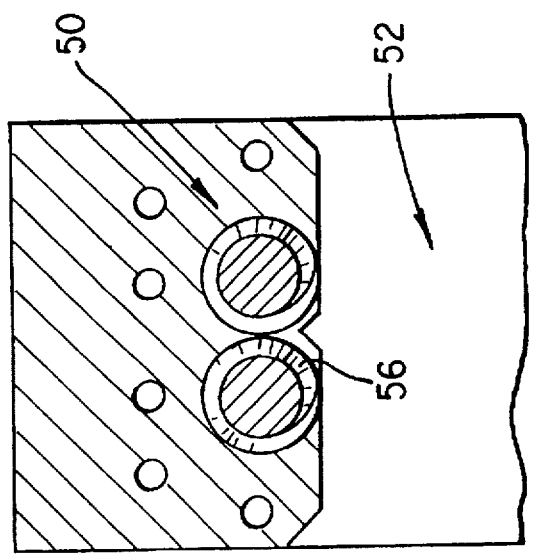
FIG. 4 is a front elevational view of the extruder head shown in FIG. 3.
Figure 3:
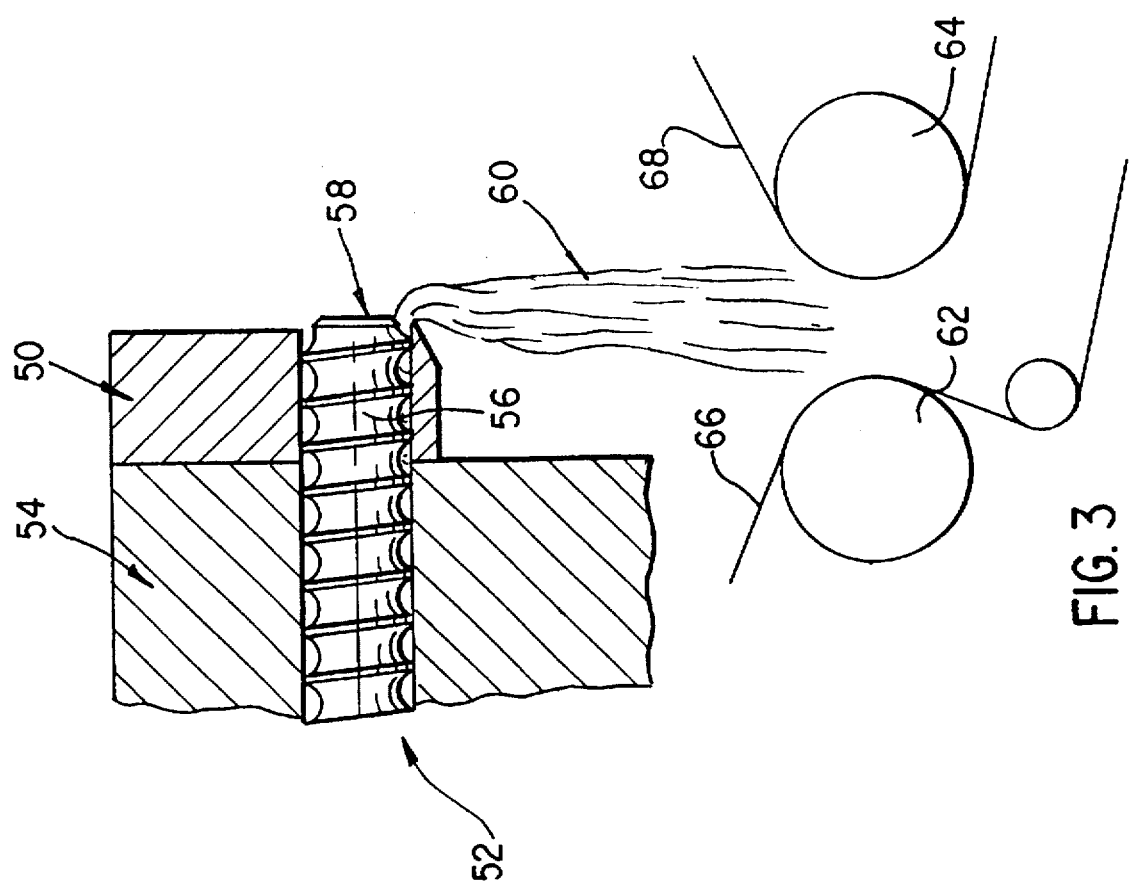
FIG. 3 is a cross-sectional view of a preferred extruder head.

A typical extruder head which is useful in avoiding excessive build-up of foam on the head is shown in FIGS. 3 and 4. Discharge plate 50 of extruder 52 is attached to barrel 54. Screw 56 has a flat tip 58 and discharged material 60 falls directly between rolls 62, 64 carrying lining paper 66, 68 for the conveyor (as shown in FIG. 1) on which the isocyanate polymer is foamed.

Figure 5:
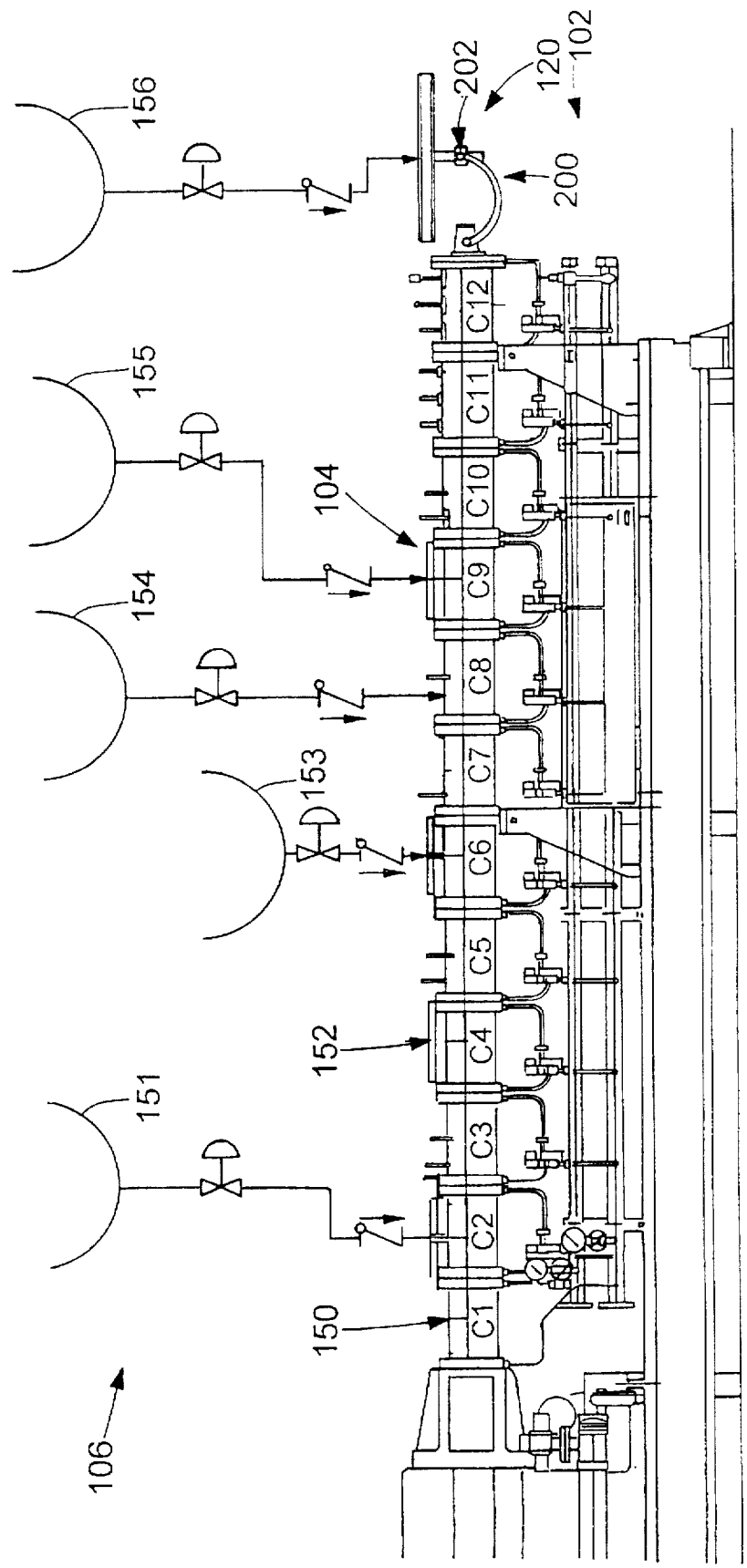
FIG. 5 is a schematic illustration of an apparatus for polymer foam.

With reference to FIG. 5, a second embodiment of an extrusion system 102 which is also suitable for practicing the invention is illustrated. Extrusion system 102 includes a single or twin screw extruder 104 and an associated reservoir system 106. The extruder 104 includes a series of barrels C1–C12 and an extruder head 120. The reservoir system 106 includes a plurality of reservoirs 150–156 from which the foam components are supplied.

The reservoirs 150–156 feed the foam component materials to the barrels C1–C12 and head 120 of the extruder 104 via a network of feed lines and valves as illustrated.

In manufacturing foam using the extrusion system of FIG. 5, filler material is preferably provided to the extruder 104 at barrels C1 and C4 from reservoirs 150 and 152. Isocyanate solution is mixed and fed to barrels C2 and C6 of the extruder 104 from reservoirs 151 and 153. The isocyanate solution may be optionally mixed with a dispersing agent and/or surfactant. Surfactant may be mixed at reservoirs 151 and 153 with the isocyanate and dispersing agent and provided to the extruder 104 with the isocyanate and dispersing agent at barrels C2 and C6.

Polyol is preferably provided from a reservoir 155 and fed to the extruder 104 at barrel C9. The surfactant, curing agent and foaming agent may be mixed with the polyol at reservoir 155 and fed to the extruder 104 at barrel C9.

Foaming agent is provided to the extruder 104 at barrel C8 without previous mixing with other components. Additionally, foaming agent may be mixed with polyol at reservoir 155 prior to entry to the extruder 104 at barrel C9. For example, foaming agent is provided to extruder 104 at barrel C9 after the foaming agent is first mixed with polyol/surfactant mixture. Catalyst is introduced into the extruder 104 via an extruder head 120 from reservoir 156.

Figure 6:
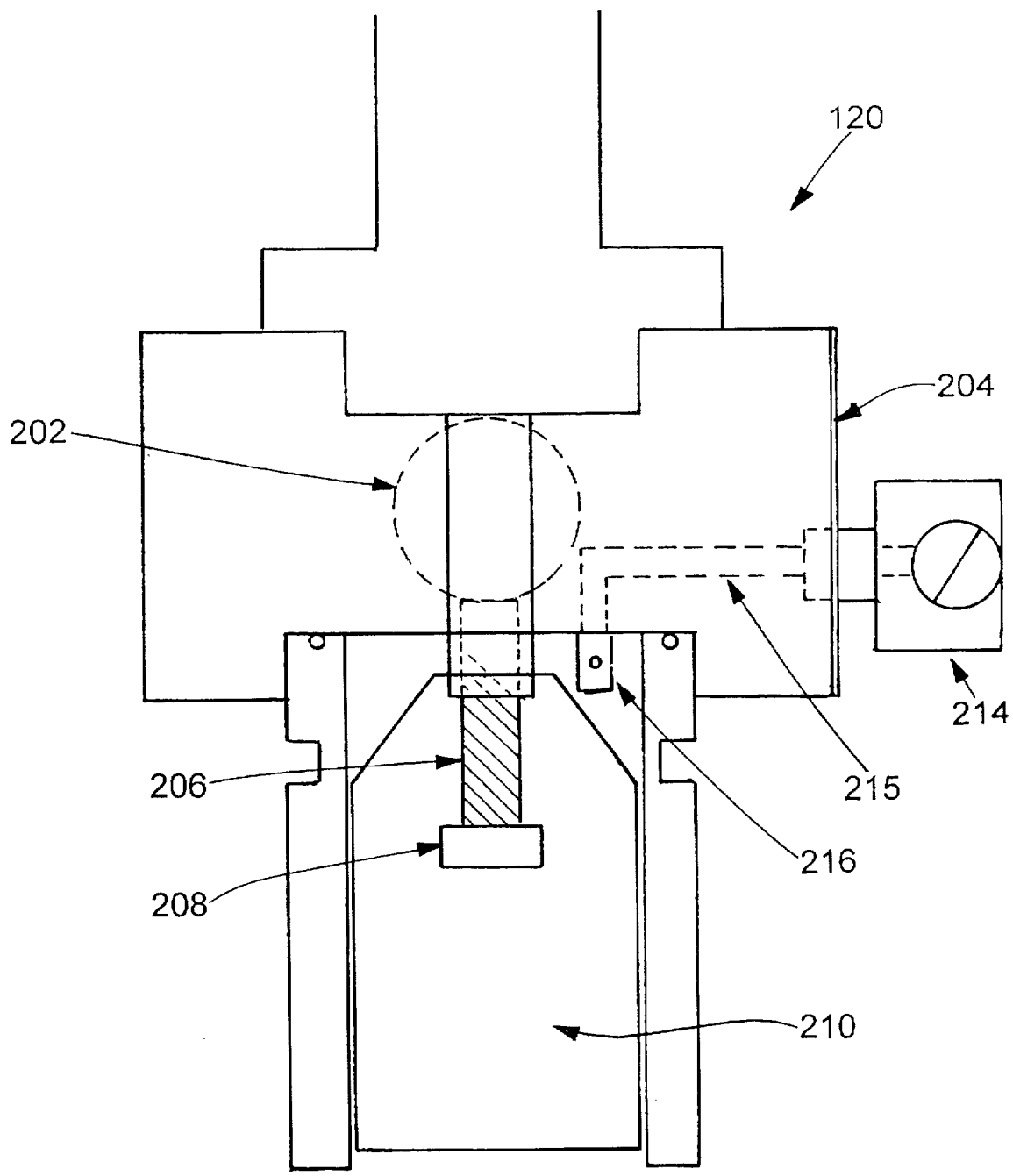
FIG. 6 is a cross-sectional side view of the extruder head for mixing catalyst with the extruding polymer foam.

A cross-sectional side view of the extruder head 120 in the extrusion system is shown in FIG. 6. The mixture of the component parts of the filler, isocyanate, polyol, and additional agents, without the catalyst, arrives via a hose 200 (shown in FIG. 5) to entry port 202 in a mixing block 204 of the extruder head 120. At mixing block 204, the component mixture travels via a worm gear 206 to agitator 208 located in a cavity area 210. Concurrently, catalyst enters at a catalyst port 214 and travels along a duct 215 to arrive in the cavity area 210 via a catalyst entry port 216. The mixture of the component parts of the filler isocyanate, polyol and additional agents and catalyst are mixed together by agitator 208 in the cavity area 210 and continues out of the cavity area 210, preferably onto a conveyor system such as the conveyor forming system 11 illustrated in FIG. 1. Preferably, the cavity 210 is 2 to 3 inches wide and the agitator is rotated at approximately 3500 to 5500 rpm.

A preferred method of manufacturing foam using the extruder of FIG. 5 includes feeding a first filler from source 150 to the extruder 104 at barrel C1. A mixture of isocyanate, dispersing agent and surfactant is fed to the extruder 104 at barrel C2 from reservoir 151. Additional filler is added from source 152 and fed to the extruder 104 at barrel C4. An additional mixture of isocyanate, dispersing agent and surfactant is then added to the extruder 104 at barrel C6 from reservoir 153. Foaming agent is provided to the extruder 104 at barrel C8 from reservoir 154. Polyol, foaming agent, surfactant and curing agent are fed to the extruder 104 at barrel C9 from reservoir 155. Finally, a catalyst or catalyst mixture is provided to the extruder head 120 from reservoir 156.

In making insulation boards, the extrusion processes described herein allow fast, economical production. The use of filler particles additionally reduces the cost of the insulation boards.

The thermal conductivity of insulation board is reduced by adding carbon black. This advantageously reduces board thickness. The thermal conductivity of polyisocyanurate foams, based on different foaming agents, in BTU per cu. ft., per hr., per °F., are as follows:

| | |
|---|---|
| isocyanurate/HCFC | 0.12 |
| isocyanurate/carbon black/HCFC | 0.09–0.1 |
| isocyanurate/water | 0.14–0.19 |
| isocyanurate/carbon black/water | 0.135–0.17 |
| isocyanurate/carbon black/HCFC/water | 0.09–0.135 |

Use of HCFC (hydrochlorofluorocarbon) foaming agent advantageously reduces the foam's thermal conductivity. Carbon black also reduces the thermal conductivity, compensating for increased thermal conductivity when water is the foaming agent. The formulation may also include inorganic flame retardants. Inorganic flame retardants increase the isocyanurate and polyol components' viscosities. A screw extruder allows thorough mixing of higher viscosity components with better dispersion for use of higher percentage of filler materials. The mix is discharged from the extruder prior to the start of the firming reaction.

A filler particle dispersion may be made in the extruder using the filler particles, carbon black, optional surfactant and isocyanate or polyol. Dispersions may be used immediately or stored for future use. Isocyanate dispersions are preferred where storage is intended since polyol dispersions tend to become less disperse when stored.

EXAMPLES

The following Examples 1–48 were made in accordance with the process described in conjunction with FIGS. 1–4. Examples 49–60 were made using the alternate embodiment of the process as described in conjunction with FIGS. 5–6.

Examples 1 to 33

Carbon Black Dispersion Made in the Extruder Screw

Table 1 shows the composition used for each formulation and Table 2 shows the composition of each polyol premix, used as indicated in Table 1. Pelron P-344 dispersant and Cabot Black Pearls 280 carbon black were used in all the examples. The catalyst was a 3:1 blend, by weight, of potassium octoate and DMP-30. A catalyst blend of 3:1 to 6:1 may be used. The ratio of the catalyst blend is dependent upon how close the catalyst is added to the extruder outlet. The average equivalent weight of BASF 226 prepolymer (polymer/isocyanate mix) and ICI high viscosity isocyanate is about 152.

TABLE 1

| Formulation | Component | Parts by Weight | % | Index | % Trimer |
|---|---|---|---|---|---|
| I | Premix I | 40.6 | 11.8 | 2.74 | 12.4 |
| | 2852E Polyol | 59.4 | 17.2 | | |
| | MR-200 Isocyanate | 192.0 | 55.7 | | |
| | Catalyst | 7.5 | 2.2 | | |
| | HCFC - 141b | 45.0 | 13.1 | | |
| II | Premix II | 40.6 | 11.2 | 2.93 | 12.8 |
| | Carbon Black (C/B) | 17.4 | 4.8 | | |
| | 2852E Polyol | 59.4 | 16.4 | | |
| | MR-200 Isocyanate | 192.0 | 53.0 | | |
| | Catalyst | 7.5 | 2.1 | | |
| | HCFC - 141b | 45.0 | 12.4 | | |
| III | Premix III | 63.5 | 17.0 | 3.00 | 12.9 |
| | Carbon Black (C/B) | 27.2 | 7.3 | | |
| | 2852E Polyol | 36.5 | 9.8 | | |
| | MR-200 Isocyanate | 192.0 | 51.5 | | |
| | Catalyst | 7.5 | 2.0 | | |
| | HCFC-141b | 46.3 | 12.4 | | |
| IV | Premix IV | 40.6 | 11.5 | 2.97 | 12.7 |
| | Carbon Black (C/B) | 17.4 | 4.9 | | |
| | 2852E Polyol | 50.0 | 14.2 | | |
| | Isocyanate (ICI, or BASF 226 Prepolymer) | 192.0 | 54.5 | | |
| | Catalyst | 7.5 | 2.1 | | |
| | HCFC-141b | 45.0 | 12.8 | | |

TABLE 2

| Polyol Premix | I | | II | | III | | IV | |
|---|---|---|---|---|---|---|---|---|
| | pbw | % | pbw | % | pbw | % | pbw | % |
| 2852E Polyol | 37.1 | 91.4 | 33.9 | 83.5 | 55.0 | 86.6 | 33.9 | 83.5 |
| Y10222 Surfactant | 3.5 | 8.6 | 3.5 | 8.6 | 3.5 | 5.5 | 3.5 | 8.6 |
| P-344 Dispersant | — | — | 3.2 | 7.9 | 5.0 | 7.9 | 3.2 | 7.9 |

The operating run schedule is shown in Table 3 and operating parameters of the extruder are shown in Table 4. The torque developed was higher for the carbon black dispersions when compared with the white controls, but was still very low relative to the capabilities of the extruder, and is not a limiting factor. Exit temperatures of the foam mix are shown to be a function of the level of carbon black and the original viscosity of the dispersion medium. The preferred exit temperature is about 25° to 32° C.

Table 5 shows properties of selected test foams.

TABLE 3

RUN SCHEDULE

| Run No. | Formation | Foam Type | Key Variable |
|---|---|---|---|
| 1 | I | White Control | Density Check 1.65 |
| 2 | I | White Control | Lower 141b 1.67 |
| 3 | I | White Control | Higher 141b 1.51 |
| 4 | II | Black Control | Hegman 7 |
| 5 | II | Black Control | Lower 141b |
| 6 | II | Black Control | ISO Adjustment |
| 7 | II | Black Control | Mix/Rate Study @ 600 RPM |
| 8 | II | Black Control | Mix/Rate Study @ 500 RPM |
| 9 | II | Black Control | Mix/Rate Study @ 600 RPM |

TABLE 3-continued

RUN SCHEDULE

| Run No. | Formation | Foam Type | Key Variable |
|---|---|---|---|
| 10 | III | Black Control | Mix/Rate Study @ 600 RPM |
| 11 | III | Black Control | Mix/Rate Study @ 500 RPM |
| 12 | III | Black Control | Mix/Rate Study @ 500 RPM |
| 13, 13A | IV | Black, Prepol. | Mix @ 500 RPM, 13A Higher ISO |
| 14 | IV | Black, Prepol. | Mix @ 600 RPM |
| 15 | IV | Black, Prepol. | Mix/Rate Study @ 600 RPM |
| 16 | IV | Black, Prepol. | Mix/Rate Study @ 500 RPM |
| 17 | IV | Black, Prepol. | Mix/Rate Study @ 500 RPM |
| 18 | IV | Black, ICI | Mix @ 500 RPM |
| 19 | IV | Black, ICI | Mix @ 600 RPM |
| 20 | IV | Black, ICI | Catalyst Adjustment |
| 21 | IV | Black, ICI | 141b Adjustment |
| 22 | IV | Black, ICI | 141b Adjustment |
| 23 | IV | White, Prepol. | Control |
| 24 | IV | Black, Prepol. | Prepol + C/B |
| 25 | IV | Black, Prepol. | Higher C/B @ 500 RPM |
| 26 | IV | Black, Prepol. | Higher C/B @ 600 RPM |
| 27 | IV | Black, Prepol. | Low Rate, Low on Matl. |
| 28 | IV | White Control | ICI High Visc. ISO |
| 29 | IV | Black Control | Std. % C/B |
| 30 | IV | Black Control | Higher C/B |
| 31 | IV | Black Control | Higher C/B |
| 32 | IV | Black Control | Higher C/B |
| 33 | IV | White Control | R-22 Froth |

TABLE 4

OPERATING PARAMETERS

| Run No. | RPM | % Torque | lbs/hr | Exit Temp. °C. | % C/B | Foam Quality |
|---|---|---|---|---|---|---|
| 1 | 500 | 5.1 | 300 | 28 | 0 | Good |
| 2 | 500 | 5 | 300 | 27 | 0 | Good |
| 3 | 500 | 4.9 | 300 | 28 | 0 | Good |
| 4 | 500 | 16 | 300 | 27 | 4.8 | Good |
| 5 | 500 | 15.9 | 300 | 28 | 4.8 | Good |
| 6 | 500 | 15.8 | 300 | 28 | 4.8 | Good |
| 7 | 600 | 15.2 | 300 | 29 | 4.8 | Good |
| 8 | 500 | 17.7 | 400 | 29 | 4.8 | Good |
| 9 | 600 | 16.4 | 400 | 29 | 4.8 | Good |
| 10 | 600 | 16.7 | 450 | 29 | 7.3 | Good |
| 11 | 500 | 22 | 450 | 29 | 7.3 | Good |
| 12 | 500 | 24 | 400 | 29 | 7.3 | Good |
| 13 | 500 | 14.3 | 300 | 30, 31 | 4.8 | Good, Sl. Soft |
| 14 | 600 | 13.7 | 300 | 33 | 4.8 | Fair |
| 15 | 600 | 16.1 | 450 | 35 | 4.8 | Fair |
| 16 | 500 | 16.8 | 450 | 34 | 4.8 | Fair |
| 17 | 500 | 21.0 | 600 | 32 | 4.8 | Fair |
| 18 | 500 | 20.6 | 300 | 31 | 4.8 | V. Good |
| 19 | 600 | 19.8 | 300 | 32 | 4.8 | V. Good |
| 20 | 600 | 18.0 | 300 | 32 | 4.8 | V. Good |
| 21 | 600 | 17.6 | 300 | 33 | 4.8 | V. Good |
| 22 | 600 | 17.4 | 300 | 32 | 4.8 | V. Good |
| 23 | 500 | 7.0 | 300 | 7 | 4.8 | V. Good |
| 24 | 500 | 14.0 | 300 | 14 | 4.7 | V. Good |
| 25 | 500 | 27.0 | 300 | 27 | 7 | V. Good |
| 26 | 600 | 24.8 | 300 | 25 | 7 | V. Good |
| 27 | 600 | 24.0 | 190 | 24 | 7 | V. Good |
| 28 | 500 | 6.4 | 300 | 34 | 0 | V. Good |
| 29 | 600 | 13.5 | 300 | 37 | 4.7 | V. Good |
| 30 | 600 | 14.7 | 450 | 34 | 7 | V. Good |
| 31 | 600 | 29.0 | 300 | 39 | 7 | V. Good |
| 32 | 600 | 27.6 | 300 | 40 | 7 | V. Good |
| 33 | 600 | 26 | 300 | 33 | 0 | V. Good |

TABLE 5

| Run No. | k-Init. | k-Aged | % Closed Cell | % Friability | Density |
|---|---|---|---|---|---|
| 1 | .136 | — | — | — | 1.62 |
| 2 | .140 | — | — | — | 1.69 |
| 4 | — | .167 | 79 | 29 | |
| 7 | .128 | — | — | — | |
| 9 | .124 | — | — | — | |
| 10 | .131 | — | — | — | |
| 12 | .134 | — | — | — | |
| 13 | — | .141 | 81 | 8 | |
| 13A | — | .136 | 81 | 13 | |
| 14 | .123 | — | — | — | |
| 15 | .121 | .145 | 86 | 12 | |
| 16 | — | .138 | 85 | 13 | |
| 17 | — | .148 | 87 | 35 | |
| 18 | — | .155 | 85 | 18 | |
| 19 | .123 | .146 | — | — | |
| 20 | — | .146 | 86 | 20 | |
| 21 | .128 | — | — | — | |
| 22 | .139 | — | — | — | |
| 23 | .132 | .139 | 84 | 8 | |
| 28 | — | .149 | 90 | 20 | |
| 29 | — | .132 | — | — | |
| 33 | — | .177 | 81 | 12 | |

Example 34

Foam with Pre-Mixed Carbon Black Dispersion

Component A:
 Polymeric methyldiisocyanate (MDI) 91%
 carbon black 9%
 (viscosity: 20,000 cps)
 (dispersion quality: Hegman bar—50 microns)

Component B:
 polyol 91%
 silicone surfactant 5%
 water 4%

Component C:
 preblended catalyst (potassium octoate) 2%

Components A, B and C were mixed in the percentage ratio A:B:C of 74:24:2, by weight.

Using the apparatus of FIG. 1, the process was started by injecting component A into barrel B7 until it was observed exiting the extruder. Component B was then injected to the spacer between barrels B7 and B8, followed by injection of catalyst to barrel B9. Shutdown was performed in reverse order. The machine was purged with methylene chloride.

The product had a compression strength of 26 psi, a density of 2.3 lb./cu. ft. and a K factor (thermal conductivity) of 0.168 BTU/sq. ft./°F.

When the machine was taken apart, it was easy to remove the barrels separated by Graphoil paper. The internal surfaces of the barrel in the process section were coated with a thin hard layer of cured material but this was readily removable.

Substantially higher concentration of isocyanate (component A) leads to hard and brittle foam. Substantially higher concentration of polyol (component B) leads to rubbery, soft foam and increased exotherm of reaction.

As the speed of the machine is increased, the cell size of the foam is decreased. Variation of these parameters to provide foam having certain characteristics will be apparent to one skilled in the art.

Example 35

Carbon Black Dispersion Made in the Extruder Screw

| Component A: | polymeric methyldiisocyanate (MDI) | 100.00 parts |
|---|---|---|
| | carbon black | 9.29 parts |
| | dispersant | 1.93 parts |
| | surfactant | 1.7 parts |

Using apparatus of FIG. 1, the process was started by injecting the ingredients for component A into barrel B7 until it was observed exiting the extruder. The dispersion produced was of better quality than that produced in a Kady mill and registered more than 8 on the Hegman scale.

In a further embodiment of the invention, polyisocyanurate bunstock may be made using an extruder. The bun is cut from an extrudate which is passed from the die of the extruder to a conveyor belt having release-coated paper liners on the top, bottom and sides. A kraft paper liner having a polymer coating is suitable for use as a release paper. A 20 ft. conveyor may be used, moving at about 9 to 10 ft/min The bunstock may be from 4 in. to 2 ft. or more in thickness. The foam is warm as it exits the extruder and is allowed to cure for 4 to 6 days. In a typical example of making bunstock on an extruder, the following formulation was used:

Example 36

Bunstock Made in the Extruder

| Material | ppm |
|---|---|
| Isocyanate (Miles - Mondur MR) | 101 |
| Polymer resin (Iso-Shield - P101) | 78 |
| R-11 (Atochem - Isotron 11 or 141B) | 13.81 |
| Catalyst #1 (Air Products - TMR-3) | 1.17 |
| Catalyst #2a (Air Products - DMEA) | .312 |
| Catalyst #2b (Ashland - DEG) | .312 |

The foam was extruded from a die of an extruder, having a large cross-section, as shown in FIGS. 3 and 4, onto a conveyor lined with paper on the top, bottom and sides, to form bunstock having dimensions of about 27" high×51½" wide. The cream time was 28 sec., the gel time was 2 min. 34 sec., the rise time was 3 min. 55 sec. and the tack free time was 4 min. 31 sec. The conveyor speed was about 9 to 10 ft./min. Bunstock may be extruded at a speed of about 200 lb./min. A typical bun may be about 27"×51½"×10 ft. in size and may be cut to smaller blocks, as required. Different levels of carbon black may be used, providing different K-values.

The extruder may alternatively be used to make the filler particle dispersion only, which is then fed to a tank for storage and later use.

When the extruder is used for making both the dispersion and the foam, the cream time and gel time are relatively slow due to the size of the bunstock. The bunstock which is liquid at extrusion onto the conveyor, is firm after reaching the end of the conveyor and being released from the paper liners. The process described allows for large volume bunstock to be made, of very high quality.

Examples 37–48

High Filler Particle Content Foam

A number of examples of foams having a high filler particle content were produced using the process explained in conjunction with FIG. 2 above.

Table 6 presents the various formulations of materials which were used in the examples and Tables 7a and 7b provide a tabulation of the characteristics of the resultant thermoset foam. The examples illustrate how polymer foams can be made using the extrusion process which can contain in excess of 15% filler material.

Test runs were conducted using a ZSK-40 extruder having a 40 mm wide extruder. Depending upon the type and size of the sheet to be produced, larger capacity extruders are used for commercial production such as extruders having diameters 58 mm, 70 mm, 92 mm, or 120 mm. Table 8 provides ranges of preferred ranges of preferred processing rates for the various size extruders.

TABLE 6

| | | FORMULATION | | | | | | | | | |
|---|---|---|---|---|---|---|---|---|---|---|---|
| | | A | | B | | C | | D | | E | |
| | | pbw | % | pbw | % | pbw | % | pbw | % | pbw | % |
| Polyol | Cape 254C | 100 | 24.8 | 100 | 26 | 100 | 22.8 | 100 | 22.6 | 100 | 22.7 |
| Surfactant | D.C. 9342 | 3 | 0.8 | 3 | .78 | 2 | .5 | 2 | .5 | 2 | .5 |
| Blowing Agent | Water | 0.5 | 0.1 | 0.5 | .13 | 1.40 | .3 | 1.40 | .3 | 1.40 | .3 |
| | Forane 141b | 47.5 | 11.8 | 38 | 9.9 | 43 | 9.8 | 47 | 10.6 | 40 | 9.1 |
| | HCFC 22 | 0 | 0 | 0 | 0 | 0 | 0 | 0 | 0 | 6 | 1.4 |
| Catalyst | TMR-30 | 0.84 | .2 | 0.45 | .12 | 0.96 | .2 | 1.25 | .3 | 1.25 | .3 |
| | OMG 977 | 2.51 | 0.6 | 2.2 | .58 | 2.65 | .6 | 3.40 | .8 | 3.40 | .8 |
| | Polycat 46 | 0.54 | 0.1 | 0.39 | .11 | 0.57 | .1 | 0.65 | .2 | 0.65 | .2 |
| Filler | Alumina Trihydrate | 76 | 19 | 72.27 | 18.7 | 0 | 0 | 0 | 0 | 77.40 | 17.6 |
| | Calcium Carbonate | 0 | 0 | 0 | 0 | 73.80 | 16.8 | 0 | 0 | 0 | 0 |

TABLE 6-continued

| | | FORMULATION | | | | | | | | | |
|---|---|---|---|---|---|---|---|---|---|---|---|
| | | A | | B | | C | | D | | E | |
| | | pbw | % | pbw | % | pbw | % | pbw | % | pbw | % |
| | Non-expanded Perlite | 0 | 0 | 0 | 0 | 0 | 0 | 77.80 | 17.6 | 0 | 0 |
| ISOCYANATE | | 171.84 | 42.7 | 168.4 | 44 | 214.19 | 48.8 | 208.45 | 47.2 | 208.45 | 47.3 |

TABLE 7a

| EXAMPLE | 37 | 38 | 39 | 40 | 41 | 42 |
|---|---|---|---|---|---|---|
| Formulation Type | A | A | A | A | B | B |
| Iso Index | 2.30 | 2.50 | 2.50 | 2.50 | 2.50 | 2.20 |
| Avg. Thickness | 1.53" | 1.56" | 1.56" | 2.12" | 1.28" | 1.44" |
| Board Density | 2.29 | 2.45 | 2.54 | 2.09 | 2.83 | 2.48 |
| Core Density | 2.10 | 2.39 | 2.39 | 1.86 | 2.61 | 2.17 |
| K-Value | 0.138 | 0.136 | 0.138 | 0.135 | 0.133 | 0.13 |
| Compressive (psi) | 22.41 | 19.6 | 26.44 | 19.34 | 32.62 | 30.4 |
| % Closed Cell | 82.00% | 84.20% | 83.30% | 83.30% | 81.00% | 77.30% |
| Hot Dip | good | good | good | good | good | good |
| Cold Aging (% shrink) machine/crosscut | 0.00%/ 0.42% | 0.58%/ 0.00% | 0.42%/ 0.00% | 0.00%/ 0.00% | 0.00%/ 0.00% | 0.00%/ 0.00% |
| Humid Aging (% growth) machine/crosscut | 0.93%/ 0.45% | 0.37%/ 0.69% | 0.37%/ 0.45% | 0.56%/ 0.00% | 0.37%/ 0.34% | 0.37%/ 0.34% |

TABLE 7b

| EXAMPLE | 43 | 44 | 45 | 46 | 47 | 48 |
|---|---|---|---|---|---|---|
| Formulation Type | C | C | O | O | E | E |
| Iso Index | 2.60 | 2.60 | 2.50 | 2.50 | 2.50 | 2.50 |
| Avg. Thickness | 1.33 | 2.50 | 1.44 | 2.43 | 1.44 | 2.44 |
| Board Density | 2.42 | 2.33 | 2.38 | 2.33 | 2.89 | 1.99 |
| Core Density | 2.28 | 2.28 | 2.14 | 2.14 | 2.59 | 1.86 |
| K-Value | 0.141 | 0.141 | 0.138 | 0.135 | 0.138 | 0.134 |
| Compressive (psi) | 14.6 | 18.0 | 22.04 | 21.82 | 22.50 | 20.66 |
| % Closed Cell | 81.13% | 82.17% | 83.37% | 82.00% | 84.19% | 82.63% |
| Hot Dip | good | good | good | good | good | good |
| Cold Aging (% shrink) machine/cross cut | 0.00%/ 0.00% | 0.09%/ 0.12% | 0.17%/ 0.00% | 0.11%/ 0.08% | 0.00%/ 0.00% | 0.08%/ 0.00% |
| Humid Aging (% growth) machine/cross cut | 0.06%/ 0.17% | 0.12%/ 0.11% | 0.06%/ 0.12% | 0.13%/ 0.17% | 0.00%/ 0.00% | 0.06%/ 0.17% |

TABLE 8

| | Extruder Output Ranges[1] | | | | |
|---|---|---|---|---|---|
| Extruder | ZSK-40 | ZSK-58 | ZSK-70 | ZSK-92 | C-120 |
| High Range | | | | | |
| lbs/hr | 450 | 1350 | 2411 | 5500 | 12150 |
| lbs/min | 7.5 | 22.5 | 40 | 92 | 202.5 |
| Low Range | | | | | |
| lbs/hr | 600 | 1800 | 3215 | 7300 | 16200 |
| lbs/min | 10 | 30 | 54 | 122 | 270 |
| ft/min | — | 33–44 | 58–78 | 134–177 | 276–391 |

[1]Calculated for 1" thick foam product 49" wide and 2.0 lbs/cu. ft. in-place density.

Examples 49–60

Tables 9a, 9b and 9c present the various relations of materials used in Examples 49–60. Tables 10a and 10b provide a tabulation of characteristics of the resultant thermoset foam examples. The examples illustrate how polymer foams can be made using the extrusion process while using ammonium phosphate and/or fly ash, with and without carbon black or alumina as fillers.

TABLE 9a

| | | FORMULATION | | | | | | | |
|---|---|---|---|---|---|---|---|---|---|
| | | 49 | | 50 | | 51 | | 52 | |
| | | pbw | % | pbw | % | pbw | % | pbw | % |
| Polyol | Cape 254C | 100 | 26.6 | 100 | 25.2 | 100 | 23.7 | 100 | 26.6 |
| Surfactant | D.C. 9342 | 2.0 | 0.5 | 2.0 | 0.5 | 2.0 | 0.5 | 2.0 | 0.5 |
| Blowing Agent | Water | 0.6 | 0.2 | 0.6 | 0.2 | 0.6 | 0.1 | 0.6 | 0.2 |
| | Forane 141b | 41.5 | 11.0 | 41.5 | 10.4 | 41.5 | 9.9 | 41.5 | 11.0 |
| | HCFC 22 | 5 | 1.5 | 5 | 1.3 | 5 | 1.2 | 5 | 1.5 |

TABLE 9a-continued

|  |  | FORMULATION | | | | | | | |
|---|---|---|---|---|---|---|---|---|---|
|  |  | 49 | | 50 | | 51 | | 52 | |
|  |  | pbw | % | pbw | % | pbw | % | pbw | % |
| Catalyst | Octoate P-5 | 8 | 2.0 | 8 | 2.0 | 8 | 1.9 | 8 | 2.0 |
|  | Polycat 46 |  |  |  |  |  |  |  |  |
| Filler | Ammonium Phosphate | — | — | — | — | — | — | 19 | 5 |
|  | Alumina | — | — | — | — | — | — | — | — |
|  | Flyash | 19 | 5 | 29.8 | 7.5 | 42.2 | 10 | 19 | 5 |
|  | Carbon Black | 19 | 5 | 29.8 | 7.5 | 42.2 | 10 | — | — |
| Isocyanate |  | 175 | 46.6 | 175 | 44.0 | 175 | 41.4 | 175 | 46.6 |
| Dispersing Agent |  | 1.75 | 0.5 | 1.75 | 0.4 | 1.75 | 0.4 | 1.75 | 0.5 |
| Curing Agent 828 |  | 4.0 | 1.1 | 4.0 | 1.0 | 4.0 | 0.9 | 4.0 | 1.1 |

TABLE 9b

|  |  | FORMULATION | | | | | | | |
|---|---|---|---|---|---|---|---|---|---|
|  |  | 53 | | 54 | | 55 | | 56 | |
|  |  | pbw | % | pbw | % | pbw | % | pbw | % |
| Polyol | Cape 254C | 100 | 25.2 | 100 | 23.7 | 100 | 26.6 | 100 | 25.2 |
| Surfactant | D.C. 9342 | 2.0 | 0.5 | 2.0 | 0.5 | 2.0 | 0.5 | 2.0 | 0.5 |
| Blowing Agent | Water | 0.6 | 0.2 | 0.6 | 0.1 | 0.6 | 0.2 | 0.6 | 0.2 |
|  | Forane 141b | 41.5 | 10.4 | 41.5 | 9.9 | 41.5 | 11.0 | 41.5 | 10.4 |
|  | HCFC 22 | 5 | 1.3 | 5 | 1.2 | 5 | 1.5 | 5 | 1.3 |
| Catalyst | Octoate P-5 | 8 | 2.0 | 8 | 1.9 | 8 | 2.0 | 8 | 2.0 |
|  | Polycat 46 |  |  |  |  |  |  |  |  |
| Filler | Ammonium Phosphate | 29.8 | 7.5 | 42.2 | 10 | 19 | 5 | 29.8 | 7.5 |
|  | Alumina | — | — | — | — | — | — | — | — |
|  | Flyash | 29.8 | 7.5 | 42.2 | 10 | — | — | — | — |
|  | Carbon Black | — | — | — | — | 19 | 5 | 29.8 | 7.5 |
| Isocyanate |  | 175 | 44.0 | 175 | 41.4 | 175 | 46.6 | 175 | 44.0 |
| Dispersing Agent |  | 1.75 | 0.4 | 1.75 | 0.4 | 1.75 | 0.5 | 1.75 | 0.4 |
| Curing Agent 828 |  | 4.0 | 1.1 | 4.0 | 0.9 | 4.0 | 1.1 | 4.0 | 1.1 |

TABLE 9c

|  |  | FORMULATION | | | | | | | |
|---|---|---|---|---|---|---|---|---|---|
|  |  | 57 | | 58 | | 59 | | 60 | |
|  |  | pbw | % | pbw | % | pbw | % | pbw | % |
| Polyol | Cape 254C | 100 | 23.7 | 100 | 26.6 | 100 | 26.6 | 100 | 29.6 |
| Surfactant | D.C. 9342 | 2.0 | 0.5 | 2.0 | 0.5 | 2.0 | 0.5 | 2.0 | 0.6 |
| Blowing Agent | Water | 0.6 | 0.1 | 0.6 | 0.2 | 0.6 | 0.2 | 0.6 | 0.2 |
|  | Forane 141b | 41.5 | 9.9 | 41.5 | 11.0 | 41.5 | 11.0 | 41.5 | 12.2 |
|  | HCFC 22 | 5 | 1.2 | 5 | 1.5 | 5 | 1.5 | 5 | 1.5 |
| Catalyst | Octoate P-5 | 100 | 1.9 | 8 | 2.0 | 8 | 2.0 | 8 | 2.4 |
|  | Polycat 46 |  |  |  |  |  |  |  |  |
| Filler | Ammonium Phosphate | 42.2 | 10 | 38 | 10 | 19 | 5 | — | — |
|  | Alumina | — | — | — | — | 19 | 5 | — | — |
|  | Flyash | — | — | — | — | — | — | — | — |
|  | Carbon Black | 42.2 | 10 | — | — | — | — | — | — |
| Isocyanate |  | 175 | 41.4 | 175 | 46.6 | 175 | 46.6 | 175 | 51.8 |

TABLE 9c-continued

| | FORMULATION | | | | | | | |
|---|---|---|---|---|---|---|---|---|
| | 57 | | 58 | | 59 | | 60 | |
| | pbw | % | pbw | % | pbw | % | pbw | % |
| Dispersing Agent | 1.75 | 0.4 | 1.75 | 0.5 | 1.75 | 0.5 | 1.75 | 0.5 |
| Curing Agent 828 | 4.0 | 0.9 | 4.0 | 1.1 | 4.0 | 1.1 | 4.0 | 1.2 |

TABLE 10a

| EXAMPLE | 49 | 50 | 51 | 52 | 53 | 54 |
|---|---|---|---|---|---|---|
| Avg. Thickness | 1.49" | 1.48" | 1.56" | 1.48" | 1.51" | 1.51" |
| Board Density | 1.98 | 2.06 | 2.27 | 1.96 | 2.14 | 2.14 |
| Core Density | 1.82 | 1.91 | 2.04 | 1.83 | 1.98 | 1.87 |
| K-Value | 0.134 | 0.133 | 0.141 | 0.136 | 0.138 | 0.137 |
| Compressive | 26.18 | 28.02 | 26.19 | 27.99 | 29.88 | 26.68 |
| Hot Dip | good | good | good | good | good | good |

TABLE 10b

| EXAMPLE | 55 | 56 | 57 | 59 | 59 | 60 |
|---|---|---|---|---|---|---|
| Avg. Thickness | 1.49" | 1.51" | 1.54" | — | — | — |
| Board Density | 1.83 | 1.91 | 2.06 | 1.88 | 1.91 | 1.96 |
| Core Density | 1.69 | 1.80 | 1.84 | 1.77 | 1.74 | 1.81 |
| K-Value | 0.130 | 0.137 | 0.133 | 0.127 | — | 0.135 |
| Compressive | 27.51 | 28.01 | 26.46 | 32.61 | 29.79 | — |
| Hot Dip | good | good | good | good | good | — |

The extruded examples contain various amounts of filler, which include examples at greater than 12% filler material. Polyol was premixed with foaming agent and curing agent prior to introduction into the extruder. Isocyanate was premixed with surfactant prior to introduction into the extruder. Catalyst was fed at the extruder head as previously described with reference to FIG. 6.

Various properties were maintained within set parameters for Examples 49–60. Cold aging, the percentage of shrinkage, remained less than 2%. Humid aging, the percentage of growth, also remained less than 2%. Percent (%) closed cell was in the range of 89–93% and Hegman Scale readings greater than 7.5 for the dispersions were present for all the examples While the invention has been described with reference to certain embodiments thereof, it will be appreciated that variations and modifications may be made without departing from the spirit and scope of the invention.

What is claimed is:

1. A method for preparing a thermosetting polymer foam product comprising:

introducing polyol to a screw of an extruder;

introducing isocyanate to the screw of the extruder;

introducing filler particles to the screw of the extruder;

mixing the polyol and the isocyanate in the screw of the extruder;

introducing foaming agent to the screw of the extruder;

introducing catalyst to the extruder at a position proximate to the extruder head of the extruder;

mixing the catalyst with the foaming agent, the isocyanate, the polyol, and the filler particles in the extruder to form a composite mixture, thereby reacting the isocyanate and polyol and initiating a foaming reaction in the composite mixture in the extruder in conjunction with extrusion whereby expansion of the composite mixture into a foam takes place outside the extruder.

2. A method according to claim 1 wherein the catalyst is introduced into a barrel of the extruder adjacent the extruder head.

3. A method according to claim 1 wherein the catalyst is introduced into the extruder head.

4. A method according to claim 1 further comprising the step of laminating the extruded composite mixture between an upper paper liner and a lower paper liner and thereby forming a laminated insulation sheet.

5. A method according to claim 1 wherein the filler particles are selected from a group consisting of aluminum trihydrate, perlite, carbon black, diatomaceous earth, polyiso powders, ammonium phosphate, fly ash, barium sulfate, calcium silicate, melamine, and calcium carbonate.

6. A method according to claim 1 further comprising the step of mixing a surfactant with the isocyanate to prepare a surfactant/isocyanate mixture before introducing the surfactant/isocyanate mixture to the screw of the extruder.

7. A method according to claim 1 further comprising the step of introducing the filler particles to the screw of the extruder at more than one position.

8. A method according to claim 1 further comprising the step of mixing foaming agent with the polyol to prepare a foaming agent/polyol mixture before introducing the foaming agent/polyol mixture so formed to the screw of the extruder.

9. A method according to claim 1 further comprising the step of mixing curing agent with the polyol to prepare a curing agent/polyol mixture before introducing the curing agent/polyol mixture so formed to the screw of the extruder.

10. A method according to claim 8 further comprising the step of mixing curing agent with the polyol and foaming agent to prepare a curing agent/foaming agent/polyol mixture before introducing the curing agent/foaming agent/polyol mixture so formed to the screw of the extruder.

11. A method according to claim 1 wherein the foaming agent is selected from the group consisting of hydrochlorofluorocarbon (HCFC) HC, HFC, CFC, water, liquid $CO_2$ and mixtures thereof.

12. A method according to claim 11 wherein the foaming agent comprises water and HCFC.

13. A method according to claim 8 wherein said filler particles comprise at least 12% by weight of said thermoset polymer foam.

14. A method according to claim 8 wherein said filler particles comprise from 15–50% by weight of said thermoset polymer foam.

15. A method according to claim 1 wherein said filler particles are introduced at a first position in the extruder, a premix of said isocyanate and a surfactant is mixed with said filler particles at a second position in the extruder, said foaming agent is introduced at a third position in the extruder downstream the second position, and a premix of surfactant, polyol and curing agent is added at a fourth position in the extruder downstream said third position.

16. A method according to claim 1 wherein filler particles are added at a position between the second and third position in addition to the filler particles added at the first position of the extruder.

17. A method according to claim 1 comprising cooling the composite mixture before extruding to maintain temperature below 50° C.

18. A method according to claim 1 wherein the extruder is a twin screw extruder and is operated at 300 to 900 rpm.

* * * * *

UNITED STATES PATENT AND TRADEMARK OFFICE
CERTIFICATE OF CORRECTION

PATENT NO. : 5,723,506
DATED : March 3, 1998
INVENTOR(S) : Glorioso et al.

It is certified that error appears in the above-identified patent and that said Letters Patent is hereby corrected as shown below:

In Table 7b, at column 13, line 39, after the second letter "C", delete "0" both occurrences and insert for each --D--.

In column 18, line 53, please insert --,-- after the word "(HCFC)".

Signed and Sealed this

Twenty-fifth Day of August, 1998

*Attest:*

*Attesting Officer*

BRUCE LEHMAN

*Commissioner of Patents and Trademarks*